(12) United States Patent
Mok et al.

(10) Patent No.: US 12,342,090 B2
(45) Date of Patent: Jun. 24, 2025

(54) IMAGE SENSOR WITH HYBRID BINNING

(71) Applicant: SEMICONDUCTOR COMPONENTS INDUSTRIES, LLC, Scottsdale, AZ (US)

(72) Inventors: Kai Yau Mok, Cupertino, CA (US); Marko Mlinar, Horjul (SI)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 211 days.

(21) Appl. No.: 18/321,346

(22) Filed: May 22, 2023

(65) Prior Publication Data

US 2024/0397225 A1 Nov. 28, 2024

(51) Int. Cl.
*H04N 25/77* (2023.01)
*H04N 25/11* (2023.01)
*H04N 25/46* (2023.01)
*H04N 25/60* (2023.01)

(52) U.S. Cl.
CPC ............. *H04N 25/77* (2023.01); *H04N 25/60* (2023.01); *H04N 25/11* (2023.01)

(58) Field of Classification Search
CPC ........ H04N 25/77; H04N 25/60; H04N 25/11; H04N 25/46; H04N 25/134
See application file for complete search history.

(56) References Cited

U.S. PATENT DOCUMENTS

| | | | |
|---|---|---|---|
| 7,982,788 B1 | 7/2011 | Linzer et al. | |
| 8,525,895 B2 | 9/2013 | Cote et al. | |
| 9,584,712 B2 * | 2/2017 | Park | H04N 25/46 |
| 11,323,640 B2 * | 5/2022 | Kim | H04N 25/46 |
| 2003/0052981 A1 | 3/2003 | Kakarala et al. | |
| 2006/0077269 A1 | 4/2006 | Kindt et al. | |
| 2008/0205792 A1 | 8/2008 | Andersen | |
| 2008/0260291 A1 | 10/2008 | Alakarhu et al. | |
| 2009/0033773 A1 | 2/2009 | Kinoshita et al. | |
| 2015/0062368 A1 | 3/2015 | Li | |
| 2015/0170337 A1 * | 6/2015 | Peng | G06T 3/00 382/298 |
| 2016/0353034 A1 | 12/2016 | Mauritzson et al. | |

(Continued)

FOREIGN PATENT DOCUMENTS

| | | | |
|---|---|---|---|
| EP | 2622839 B1 | 4/2018 | |
| EP | 2728545 B1 | 7/2018 | |

(Continued)

*Primary Examiner* — Marly S Camargo
(74) *Attorney, Agent, or Firm* — Treyz Law Group, P.C.; Joseph F. Guihan

(57) ABSTRACT

An image sensor may perform hybrid pixel binning. In pixel binning, pixel values from multiple pixels are combined into a single representative binning value. In a hybrid pixel binning scheme, different pixel groups may be binned in different ways in a single image sensor. When the range of values in a pixel group is low (indicating a flat surface), a mean or median binning scheme may be used. When the range of values in a pixel group is high (indicating an edge), a spatial weighting binning scheme may be used. When a pixel group has an intermediate range, a blend of the median/mean and spatial weighting may be used to avoid undesired blinking in the binning output. The hybrid binning scheme may reduce noise while still preserving high-frequency detail.

20 Claims, 6 Drawing Sheets

(56) References Cited

U.S. PATENT DOCUMENTS

| | | | |
|---|---|---|---|
| 2017/0006239 A1 | 1/2017 | Zhou et al. | |
| 2017/0054925 A1 | 2/2017 | Honda | |
| 2021/0385395 A1 | 12/2021 | Cha et al. | |
| 2021/0409623 A1* | 12/2021 | Jang | H04N 25/46 |
| 2022/0174234 A1 | 6/2022 | Roffet et al. | |
| 2022/0294999 A1 | 9/2022 | Kang et al. | |

FOREIGN PATENT DOCUMENTS

| | | |
|---|---|---|
| EP | 3078191 B1 | 4/2020 |
| WO | 2012061018 A2 | 5/2012 |
| WO | 2022066280 A1 | 3/2022 |

* cited by examiner

IMAGE SENSOR WITH HYBRID BINNING

BACKGROUND

Image sensors are commonly used in electronic devices such as cellular telephones, cameras, and computers to capture images. In a typical arrangement, an image sensor includes an array of image pixels arranged in pixel rows and pixel columns. Circuitry may be coupled to each pixel column for reading out image signals from the image pixels.

It is within this context that the embodiments described herein arise.

DETAILED DESCRIPTION

Embodiments of the present technology relate to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels. The pixels in the image sensors may include photosensitive elements such as photodiodes that convert the incoming light into image signals. Image sensors may have any number of pixels (e.g., hundreds or thousands or more). A typical image sensor may, for example, have hundreds or thousands or millions of pixels (e.g., megapixels). Image sensors may include control circuitry such as circuitry for operating the pixels and readout circuitry for reading out image signals corresponding to the electric charge generated by the photosensitive elements.

Figure 1:
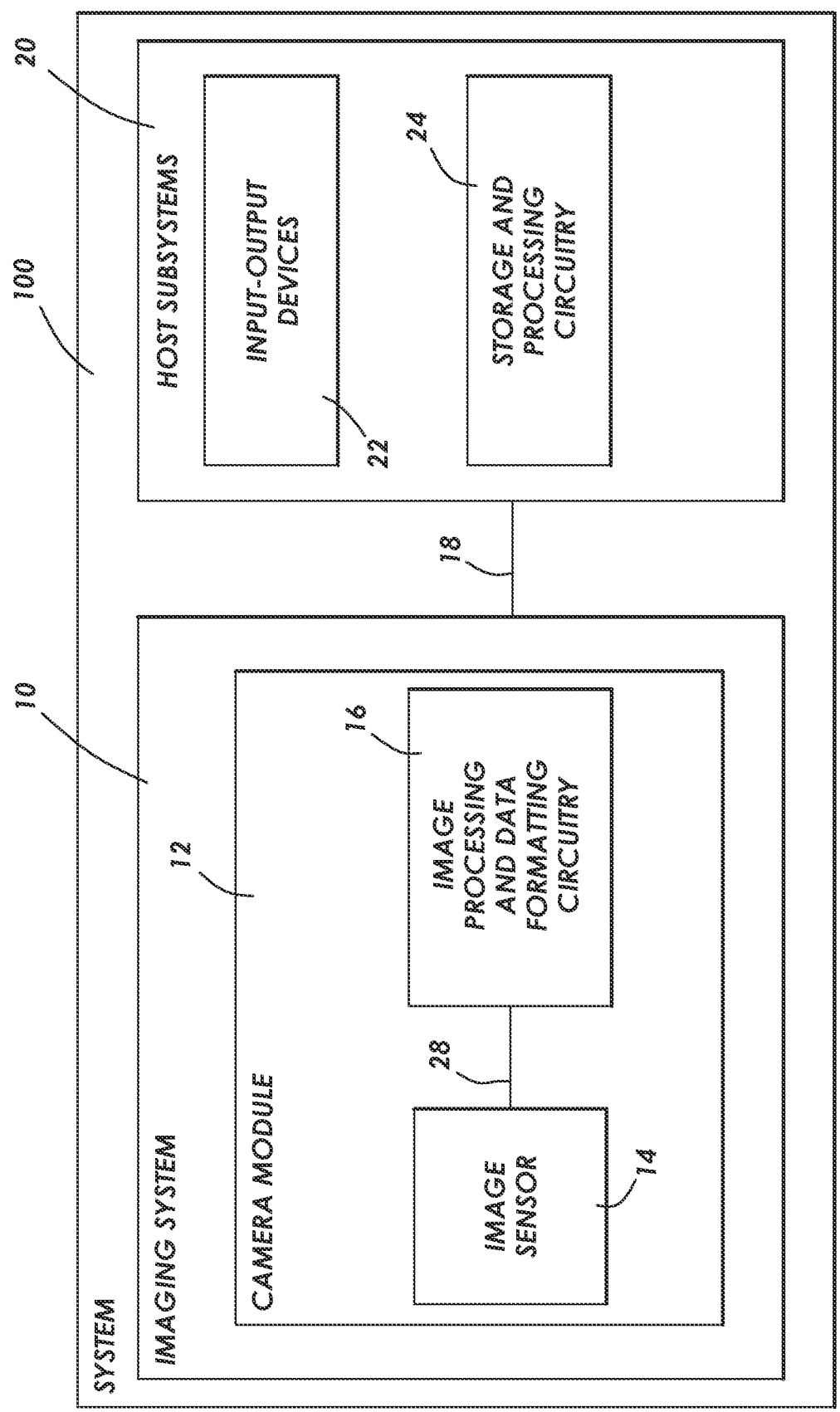
FIG. 1 is a diagram of an illustrative electronic device having an image sensor in accordance with some embodiments.

FIG. 1 is a diagram of an illustrative imaging and response system including an imaging system that uses an image sensor to capture images. System 100 of FIG. 1 may be an electronic device such as a camera, a cellular telephone, a video camera, or other electronic device that captures digital image data, may be a vehicle safety system (e.g., an active braking system or other vehicle safety system), or may be a surveillance system.

As shown in FIG. 1, system 100 may include an imaging system such as imaging system 10 and host subsystems such as host subsystem 20. Imaging system 10 may include camera module 12. Camera module 12 may include one or more image sensors 14, such as in an image sensor array integrated circuit, and one or more lenses.

During image capture operations, each lens may focus light onto an associated image sensor 14. Image sensor 14 may include photosensitive elements (i.e., image sensor pixels) that convert the light into analog data. Image sensors may have any number of pixels (e.g., hundreds, thousands, millions, or more). A typical image sensor may, for example, have millions of pixels (e.g., megapixels).

Each image sensor in camera module 12 may be identical or there may be different types of image sensors in a given image sensor array integrated circuit. In some examples, image sensor 14 may further include bias circuitry (e.g., source follower load circuits), sample and hold circuitry, correlated double sampling (CDS) circuitry, amplifier circuitry, analog-to-digital converter circuitry, data output circuitry, memory (e.g., buffer circuitry), and/or address circuitry.

Still and video image data from sensor 14 may be provided to image processing and data formatting circuitry 16 via path 28. Image processing and data formatting circuitry 16 may be used to perform image processing functions such as data formatting, adjusting white balance and exposure, implementing video image stabilization, or face detection. Image processing and data formatting circuitry 16 may additionally or alternatively be used to compress raw camera image files if desired (e.g., to Joint Photographic Experts Group or JPEG format).

In one example arrangement, such as a system on chip (SoC) arrangement, sensor 14 and image processing and data formatting circuitry 16 are implemented on a common semiconductor substrate (e.g., a common silicon image sensor integrated circuit die). If desired, sensor 14 and image processing circuitry 16 may be formed on separate semiconductor substrates. For example, sensor 14 and image processing circuitry 16 may be formed on separate substrates that have been stacked.

Imaging system 10 may convey acquired image data to host subsystem 20 over path 18. Host subsystem 20 may include input-output devices 22 and storage processing circuitry 24. Host subsystem 20 may include processing software for detecting objects in images, detecting motion of objects between image frames, determining distances to objects in images, or filtering or otherwise processing images provided by imaging system 10. For example, image processing and data formatting circuitry 16 of the imaging system 10 may communicate the acquired image data to storage and processing circuitry 24 of the host subsystems 20.

If desired, system 100 may provide a user with numerous high-level functions. In a computer or cellular telephone, for example, a user may be provided with the ability to run user applications. For these functions, input-output devices 22 of host subsystem 20 may include keypads, input-output ports, buttons, and displays and storage and processing circuitry 24. Storage and processing circuitry 24 of host subsystem 20 may include volatile and/or nonvolatile memory (e.g., random-access memory, flash memory, hard drives, solid-state drives, etc.). Storage and processing circuitry 24 may additionally or alternatively include microprocessors, microcontrollers, digital signal processors, and/or application specific integrated circuits.

Figure 2:
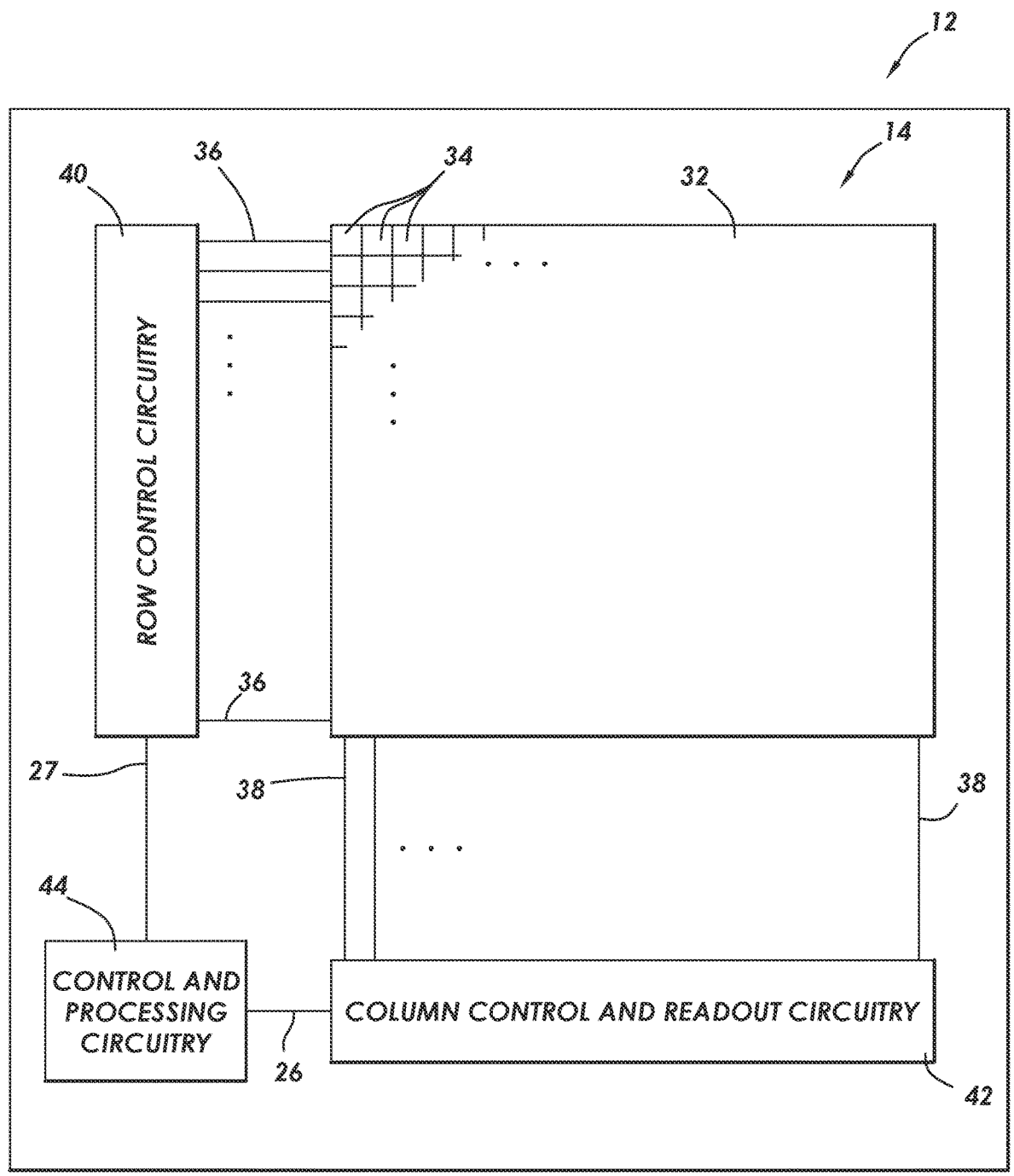
FIG. 2 is a diagram of an illustrative pixel array and associated row and column control circuitry for reading out image signals from an image sensor in accordance with some embodiments.

An example of an arrangement of image sensor 14 of FIG. 1 is shown in FIG. 2. As shown in FIG. 2, image sensor 14 may include control and processing circuitry 44. Control and processing circuitry 44 (sometimes referred to as control and processing logic) may be part of image processing and data formatting circuitry 16 in FIG. 1 or may be separate from circuitry 16. Image sensor 14 may include a pixel array such as array 32 of pixels 34 (sometimes referred to herein as image sensor pixels, imaging pixels, or image pixels). Control and processing circuitry 44 may be coupled to row control circuitry 40 via control path 27 and may be coupled to column control and readout circuits 42 via data path 26.

Row control circuitry 40 may receive row addresses from control and processing circuitry 44 and may supply corresponding row control signals to imaging pixels 34 over one or more control paths 36. The row control signals may include pixel reset control signals, charge transfer control signals, blooming control signals, row select control signals, dual conversion gain control signals, or any other desired pixel control signals.

Column control and readout circuitry 42 may be coupled to one or more of the columns of pixel array 32 via one or more conductive lines such as column lines 38. A given column line 38 may be coupled to a column of imaging pixels 34 in imaging pixel array 32 and may be used for reading out image signals from imaging pixels 34 and for supplying bias signals (e.g., bias currents or bias voltages) to imaging pixels 34. In some examples, each column of pixels may be coupled to a corresponding column line 38. For imaging pixel readout operations, a pixel row in imaging pixel array 32 may be selected using row driver circuitry 40 and image data associated with imaging pixels 34 of that pixel row may be read out by column readout circuitry 42 on column lines 38. Column readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, or column memory for storing the readout signals and any other desired data. Column control and readout circuitry 42 may output digital pixel readout values to control and processing logic 44 over line 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure. Features described herein as rows may be arranged vertically and features described herein as columns may be arranged horizontally.

Pixel array 32 may be provided with a color filter array having multiple color filter elements which allows a single image sensor to sample light of different colors. As an example, image sensor pixels such as the imaging pixels in array 32 may be provided with a color filter array which allows a single image sensor to sample red, green, and blue (RGB) light using corresponding red, green, and blue image sensor pixels. The red, green, and blue image sensor pixels may be arranged in a Bayer mosaic pattern. The Bayer mosaic pattern consists of a repeating unit cell of two-by-two imaging pixels, with two green imaging pixels diagonally opposite one another and adjacent to a red imaging pixel diagonally opposite to a blue imaging pixel. In another example, broadband imaging pixels having broadband color filter elements (e.g., clear color filter elements) may be used instead of green pixels in a Bayer pattern. These examples are merely illustrative and, in general, color filter elements of any desired color (e.g., cyan, yellow, red, green, blue, etc.) and in any desired pattern may be formed over any desired number of imaging pixels 34.

In some implementations, array 32 may be part of a stacked-die arrangement in which pixels 34 of array 32 are split between two or more stacked substrates. In such an arrangement, each of the pixels 34 in the array 32 may be split between the two dies (sometimes referred to as chips) at any desired node within the pixel. As an example, a node such as the floating diffusion node may be formed across two dies. Pixel circuitry that includes the photodiode and the circuitry between the photodiode and the desired node (such as the floating diffusion node, in the present example) may be formed on a first die, and the remaining pixel circuitry may be formed on a second die. The desired node may be formed on (i.e., as a part of) a coupling structure (such as a conductive pad, a micro-pad, a conductive interconnect structure, or a conductive via) that connects the two dies. Before the two dies are bonded, the coupling structure may have a first portion on the first die and may have a second portion on the second die. The first die and the second die may be bonded to each other such that first portion of the coupling structure and the second portion of the coupling structure are bonded together and are electrically coupled. If desired, the first and second portions of the coupling structure may be compression bonded to each other. However, this is merely illustrative. If desired, the first and second portions of the coupling structures formed on the respective first and second dies may be bonded together using any metal-to-metal bonding technique, such as soldering or welding.

As mentioned above, the desired node in the pixel circuit that is split across the two dies may be a floating diffusion node. Alternatively, the desired node in the pixel circuit that is split across the two dies may be any other node along the pixel circuit. In one alternative, the desired node split across two dies may be the node between a floating diffusion region and the gate of a source follower transistor. For example, the floating diffusion node may be formed on the first die on which the photodiode is formed, while the coupling structure may connect the floating diffusion node to the source follower transistor on the second die. In another alternative, the desired node split across two dies may be the node between a floating diffusion region and a source-drain node of a transfer transistor. For example, the floating diffusion node may be formed on the second die on which the photodiode is not located. In yet another alternative, the desired node split across two dies may be the node between a source-drain node of a source follower transistor and a row select transistor.

In general, array 32, row control circuitry 40, and column control and readout circuitry 42 may be split between two or more stacked substrates. In one example, array 32 may be formed in a first substrate and row control circuitry 40 and column control and readout circuitry 42 may be formed in a second substrate. In another example, array 32 may be split between first and second substrates (using one of the pixel splitting schemes described above) and row control circuitry 40 and column control and readout circuitry 42 may be formed in a third substrate. In other examples, row control circuitry 40 may be on a separate substrate from column control and readout circuitry 42. In yet another example, row control circuitry 40 may be split between two or more substrates and/or column control and readout circuitry 42 may be split between two or more substrates.

During operation of image sensor 14, pixel binning may sometimes be performed. During pixel binning operations, images are scaled to a smaller resolution by using pixel values from multiple imaging pixels to determine a single, representative binning value. Pixel binning may reduce power consumption and increase transmission speed in image sensor 14.

Figure 3:
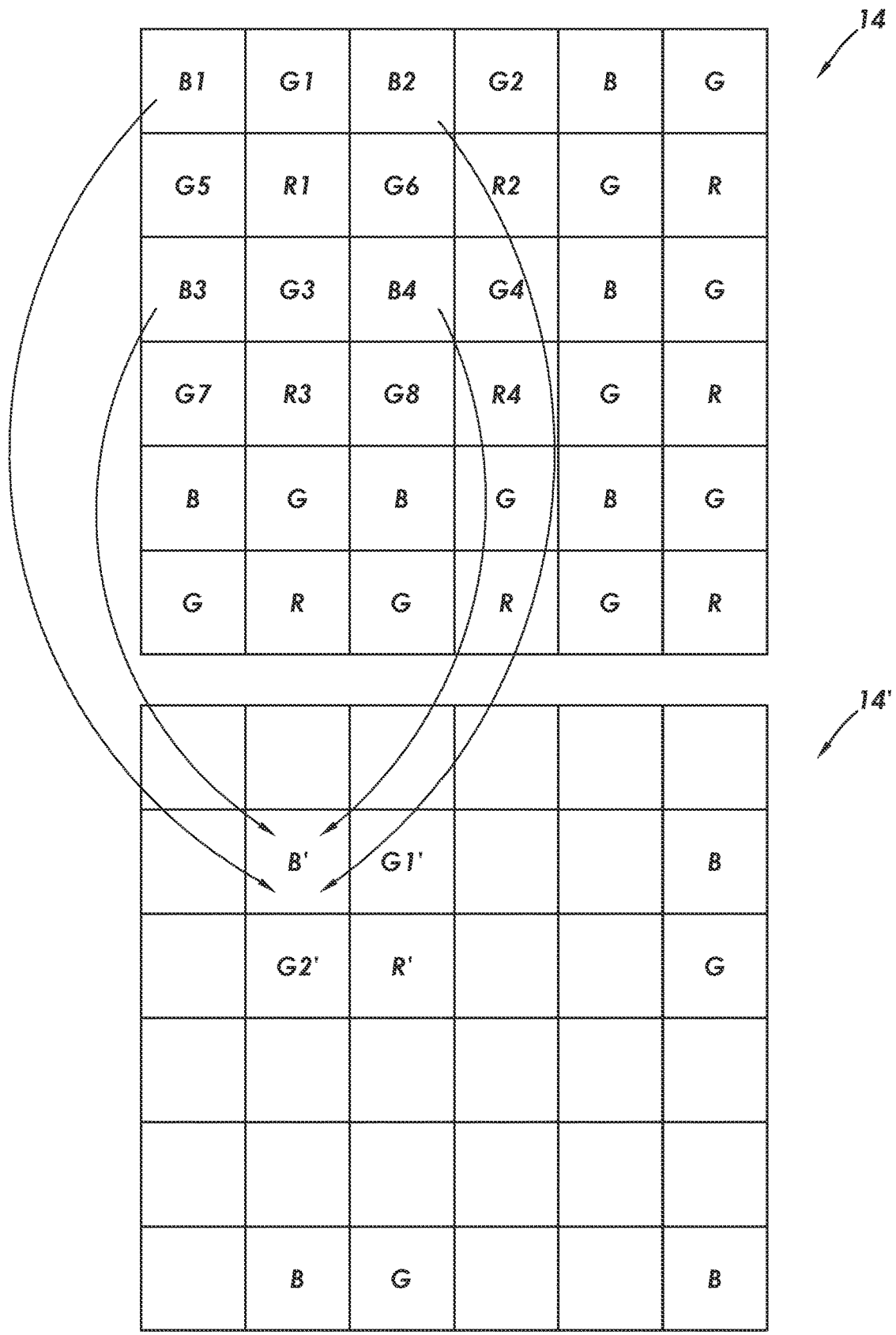
FIG. 3 is a diagram of an illustrative binning scheme in which the median or mean of a pixel group is used as the binning output in accordance with some embodiments.

A first example of pixel binning is shown in FIG. 3. In FIG. 3, the mean or median of four pixels of a single color is used as a representative binning pixel value for those four pixels. FIG. 3 shows the image sensor 14 before binning and the image sensor 14' after binning.

In FIG. 3, each pixel with a red color filter (sometimes referred to as a red imaging pixel) is labeled with an 'R', each pixel with a green color filter (sometimes referred to as a green imaging pixel) is labeled with a 'G', and each pixel with a blue color filter (sometimes referred to as a blue imaging pixel) is labeled with a 'B.' As shown, the red, green, and blue pixels are arranged in a Bayer mosaic pattern. In other words, the red, green, and blue pixels are arranged in repeating unit cells of two-by-two imaging pixels, with two green imaging pixels diagonally opposite one another and adjacent to a red imaging pixel diagonally opposite to a blue imaging pixel.

In one possible binning scheme, four imaging pixels of the same color may be averaged to obtain a representative binning value for those imaging pixels. For example, as shown in FIG. 3, blue imaging pixels B1, B2, B3, and B4 may be averaged to obtain a binning value for a binned blue imaging pixel B' in image sensor 14'. Continuing this example, red imaging pixels R1, R2, R3, and R4 may be averaged to obtain a binning value for a binned red imaging pixel R' in image sensor 14'. Green imaging pixels G1, G2, G3, and G4 may be averaged to obtain a binning value for a binned green imaging pixel G1' in image sensor 14'. Green imaging pixels G5, G6, G7, and G8 may be averaged to obtain a binning value for a binned green imaging pixel G2' in image sensor 14'.

This example shows how 16 imaging pixel values from image sensor 14 may be used to determine 4 respective binned values in image sensor 14'. This process may be repeated across the array of imaging pixels. The binning process therefore results in an effective resolution of 25% of the full resolution of the image sensor.

The example of using the mean to determine the binning value for a group of pixels is merely illustrative. Using the mean for binning may be optimal when noise in image sensor 14 is predominantly Gaussian. For example, if the image sensor is dominated by temporal noise (which has a Gaussian distribution), the mean binning scheme is optimal.

In some cases, using the median instead of the mean to obtain binning values may be preferred. Using the median for binning may be optimal when noise in image sensor 14 is predominantly non-Gaussian. For example, if the image sensor is dominated by fixed pattern noise (FPN) (which has a non-Gaussian distribution), the median binning scheme is optimal.

In a median binning scheme, the median value of blue imaging pixels B1, B2, B3, and B4 may be used as the binning value for a binned blue imaging pixel B' in image sensor 14'. Continuing this example, the median value of red imaging pixels R1, R2, R3, and R4 may be used as the binning value for a binned red imaging pixel R' in image sensor 14'. The median value of green imaging pixels G1, G2, G3, and G4 may be used as the binning value for a binned green imaging pixel G1' in image sensor 14'. The median value of green imaging pixels G5, G6, G7, and G8 may be used as the binning value for a binned green imaging pixel G2' in image sensor 14'.

Using the median as the binning value effectively removes outliers from the pixel values (e.g., because the smallest and largest of the four imaging pixel values do not impact the median). This improves binning performance when the noise has a non-Gaussian distribution.

As shown by binned sensor 14', when using the mean or median values for binning as in FIG. 3, the effective locations (centroids) of the binned pixels are unevenly spaced (e.g., there is no gap between B' and G1' and a two-pixel gap between G1' and the blue binned pixel to its right). This may cause distortion in the output binned values.

Figure 4:
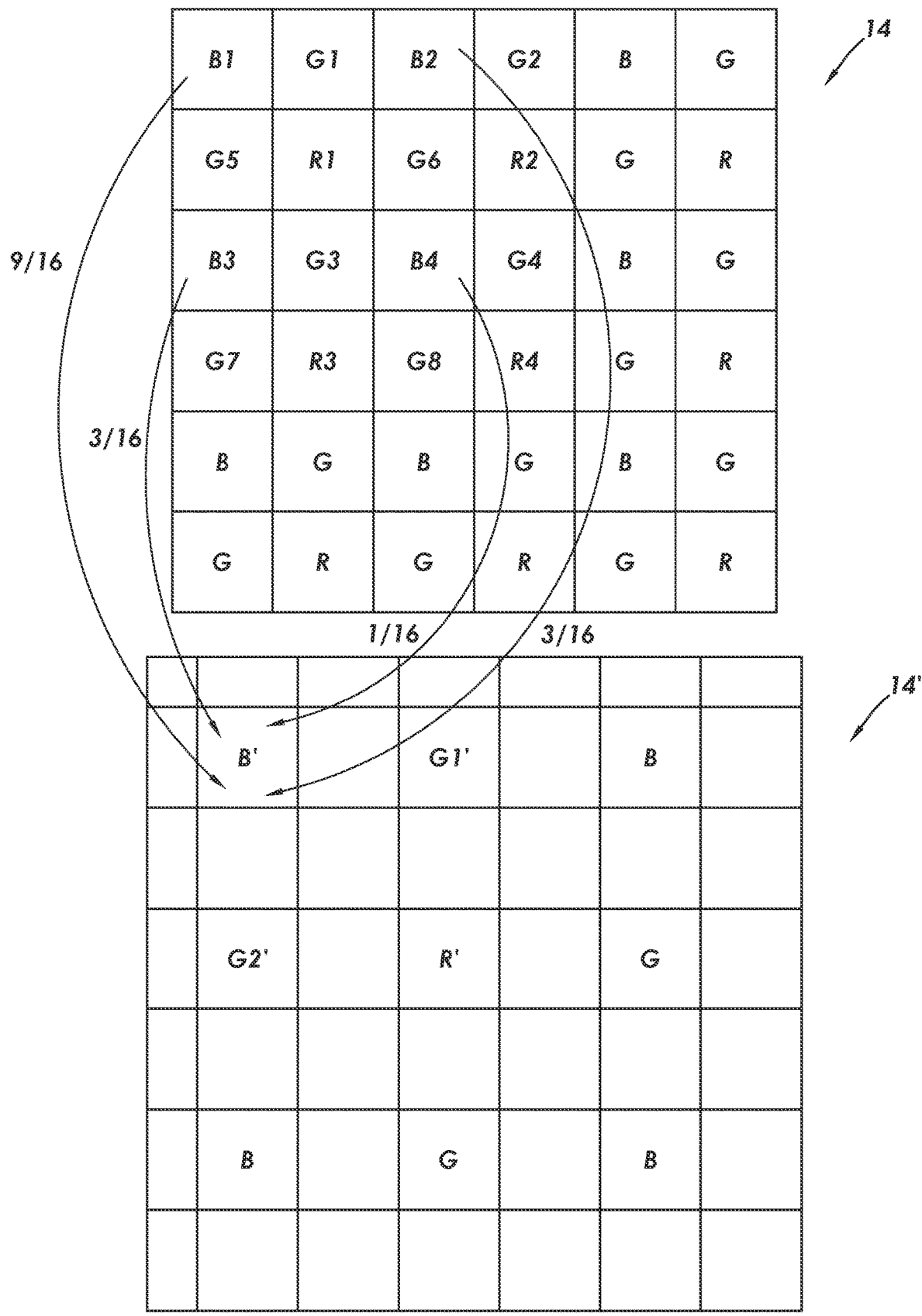
FIG. 4 is a diagram of an illustrative binning scheme in which a spatially weighted average of a pixel group is used as the binning output in accordance with some embodiments.

To mitigate displacement between the centroids of the binned pixels, a spatially weighted binning scheme may be used. FIG. 4 is an example of a spatially weighted binning scheme. As shown in FIG. 4, a weighted average is applied to each group of four imaging pixels to obtain the binning output. The weights for the weighted average may be based on the relative positions of the imaging pixels to which the weighted average is applied.

In the example of FIG. 4, $9/16$ of the value for pixel B1, $3/16$ of the value for pixel B2, $3/16$ of the value for pixel B3, and $1/16$ of the value for pixel B4 are combined to obtain the binned blue imaging pixel B' in image sensor 14'. As shown in FIG. 4, the weights applied to the respective imaging pixels B1-B4 result in the binned pixel B' in image sensor 14' having an effective location that is shifted slightly down and to the right relative to pixel B1 in image sensor 14.

Continuing the example of FIG. 4, $9/16$ of the value for pixel G2, $3/16$ of the value for pixel G1, $3/16$ of the value for pixel G4, and $1/16$ of the value for pixel G3 are combined to obtain the binned green imaging pixel G1' in image sensor 14'. As shown in FIG. 4, the weights applied to the respective imaging pixels G1-G4 result in the binned pixel G1' in image sensor 14' having an effective location that is shifted slightly down and to the left relative to pixel G2 in image sensor 14.

$9/16$ of the value for pixel G7, $3/16$ of the value for pixel G5, $3/16$ of the value for pixel G8, and $1/16$ of the value for pixel G6 are combined to obtain the binned green imaging pixel G2' in image sensor 14'. As shown in FIG. 4, the weights applied to the respective imaging pixels G5-G8 result in the binned pixel G2' in image sensor 14' having an effective location that is shifted slightly up and to the right relative to pixel G7 in image sensor 14.

$9/16$ of the value for pixel R4, $3/16$ of the value for pixel R2, $3/16$ of the value for pixel R3, and $1/16$ of the value for pixel R1 are combined to obtain the binned red imaging pixel R' in image sensor 14'. As shown in FIG. 4, the weights applied to the respective imaging pixels R1-R4 result in the binned pixel R' in image sensor 14' having an effective location that is shifted slightly up and to the left relative to pixel R4 in image sensor 14.

Spatially weighting the pixels as in FIG. 4 therefore results in equal displacement between the centroids of the binned pixels, which may mitigate distortion. As seen in FIG. 4, there is consistently a 1-pixel gap between adjacent binned pixels.

The mean or median binning schemes of FIG. 3 may tend to have a better signal-to-noise ratio (SNR) than the spatial weighting scheme of FIG. 4 when the pertinent portion of the image is flat (e.g., without edges) and the input values are therefore similar. The spatial weighting scheme of FIG. 4 may tend to have a better signal-to-noise ratio (SNR) than the mean or median binning schemes of FIG. 3 when the pertinent portion of the image has an edge and the input values therefore have a large range. In other words, the optimal binning scheme for a given group of imaging pixels may depend on the range of the corresponding imaging values. When the range is low (indicating no edges), the mean or median weight scheme of FIG. 3 may be used. When the range is high (indicating an edge), the spatial weighting scheme of FIG. 4 may be used. Using different binning schemes in different pixel groups across the image sensor may be referred to as a hybrid binning scheme or a smart binning scheme. The smart binning scheme may reduce noise while still preserving high-frequency detail (e.g., edges).

Figure 5:
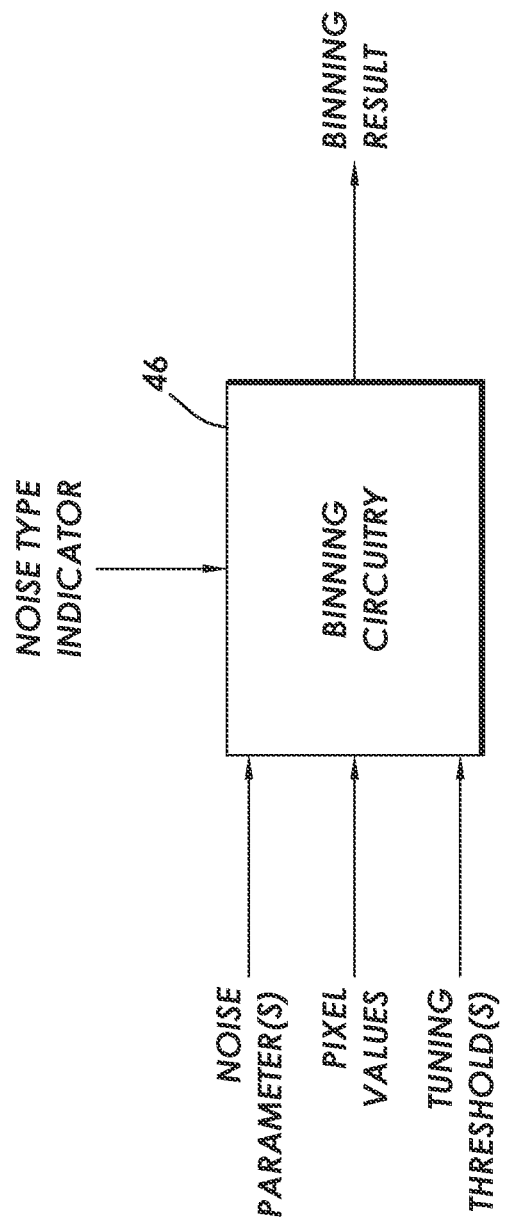
FIG. 5 is a schematic diagram of illustrative binning circuitry that performs hybrid binning operations in accordance with some embodiments.

FIG. 5 is a schematic diagram of illustrative binning circuitry for image sensor 14. Binning circuitry 46 may receive various inputs and output a corresponding binning result. Binning circuitry 46 may be considered part of image sensor 14, camera module 12, imaging system 10, system 100, column control and readout circuitry 42, control and processing circuitry 44, and/or image processing and formatting circuitry 16.

Binning circuitry 46 may receive pixel values for a group of imaging pixels. The pixel values reflect the magnitude of light received by the corresponding imaging pixel during an integration time (e.g., with a higher pixel value indicating brighter light). The binning circuitry may receive pixel values for a 2×2 group of imaging pixels (e.g., the 2×2 group formed by blue pixels B1-B4 in FIGS. 3 and 4, the 2×2 group formed by red pixels R1-R4 in FIGS. 3 and 4, the 2×2 group formed by green pixels G1-G4 in FIGS. 3 and 4, or the 2×2 group formed by green pixels G5-G8 in FIGS. 3 and 4) and output a corresponding binning result (e.g., B', R', G1', or G2' in FIGS. 3 and 4) for that 2×2 group of imaging pixels.

The binning circuitry may receive various other inputs such as one or more tuning thresholds, one or more noise parameters, and/or a noise type indicator.

The one or more tuning thresholds (sometimes referred to as tuning parameters) may include tuning thresholds such as k_low and k_high. The second tuning threshold (k_high) may be greater than the first tuning threshold (k_low). The tuning thresholds may be used to smooth the transition between a median or mean based binning scheme and a spatial weighting based binning scheme. Using a smooth transition in this manner mitigates the risk of undesirable blinking between the two binning schemes in a perceptible manner.

The one or more noise parameters may include a noise floor parameter (noise_floor) and a noise coefficient (noise_coef). The noise floor parameter may be associated with read noise in the image sensor. The noise coefficient may be associated with the gain of the imaging pixels and may vary based on the settings of the image sensor. The noise floor parameter and noise coefficient may be used to predict noise level for a flat surface. The noise floor parameter and noise coefficient may be constants for a given image sensor and/or for a given operating mode in the given image sensor. The noise floor parameter and noise coefficient may be determined using calibration or other desired techniques. The one or more noise parameters may also include an offset parameter (offset_value) that is added to pixel values before they are provided to binning circuitry 46.

The noise type indicator (select_median) may be a binary variable that is set to a first value (0) or a second value (1). When the image sensor is dominated by Gaussian noise and a mean filter is preferred for binning, select_median may be set to 0. When the image sensor is dominated by non-Gaussian noise and a median filter is preferred for binning, select_median may be set to 1.

Figure 6:
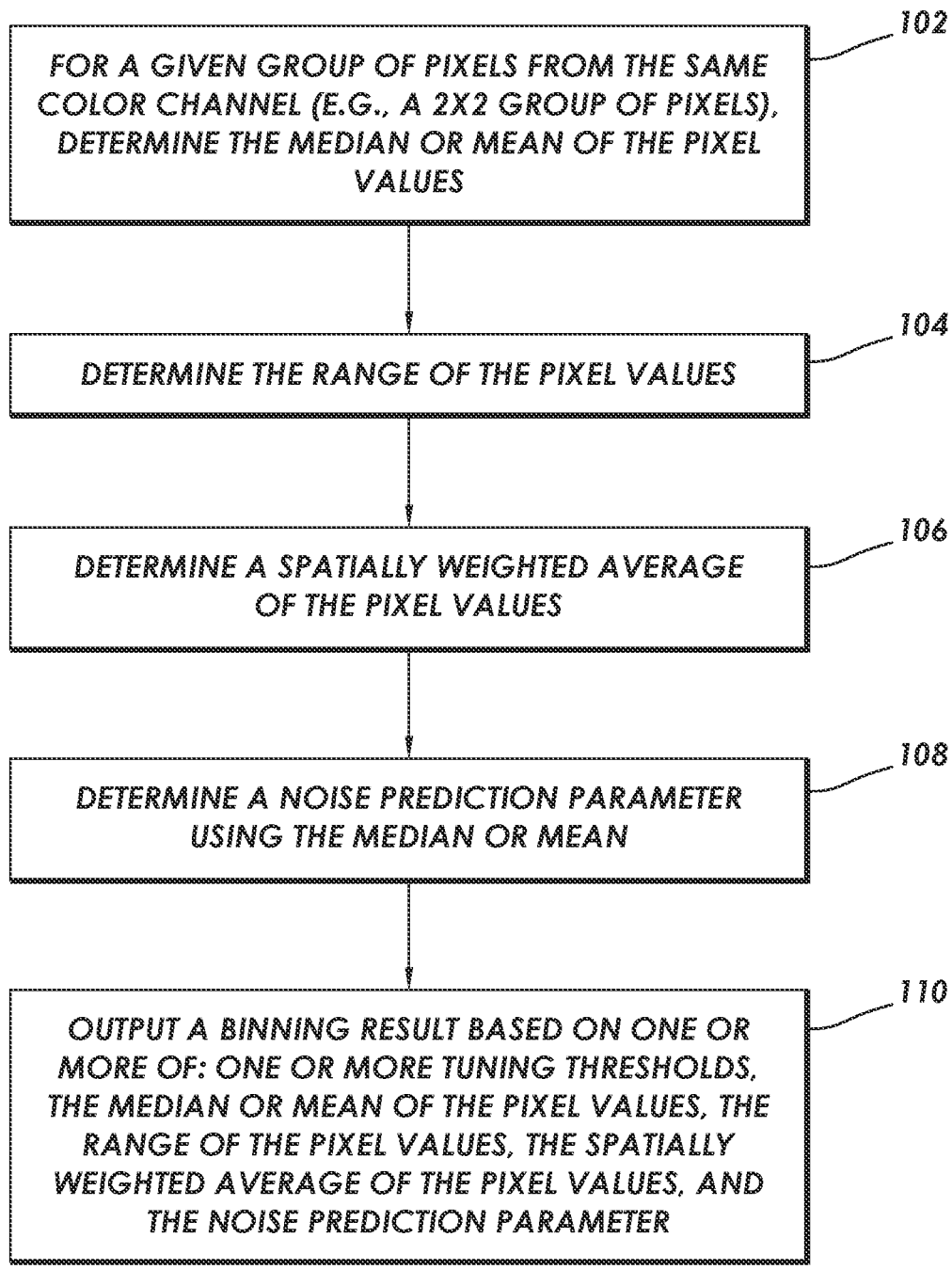
FIG. 6 is a flowchart of an illustrative method for operating an image sensor with binning circuitry in accordance with some embodiments.

FIG. 6 is a flowchart of illustrative method steps that may be performed by the binning circuitry of FIG. 5. First, at step 102, for a given group of imaging pixels of the same color, the median or mean (Pm) of the corresponding pixel values from the group of imaging pixels may be determined. The given group of imaging pixels may be a 2×2 group of imaging pixels (e.g., the 2×2 group formed by blue pixels B1-B4 in FIGS. 3 and 4, the 2×2 group formed by red pixels R1-R4 in FIGS. 3 and 4, the 2×2 group formed by green pixels G1-G4 in FIGS. 3 and 4, or the 2×2 group formed by green pixels G5-G8 in FIGS. 3 and 4) or a group of imaging pixels of any other desired size. The 2×2 group of imaging pixels has imaging pixels in two rows and two columns.

An example is described herein where the four pixel values are given as P1, P2, P3, and P4 (with P1 corresponding to the upper-left pixel in the 2×2 group, P2 corresponding to the upper-right pixel in the 2×2 group, P3 corresponding to the lower-left pixel in the 2×2 group, and P4 corresponding to the lower-right pixel in the 2×2 group).

At step 102, when select_median is equal to 1 (indicating that median is preferred over mean to minimize noise when binning an image of a flat surface) the binning circuitry may set Pm=median (P1, P2, P3, P4).

At step 102, when select_median is equal to 0 (indicating that mean is preferred over median to minimize noise when binning an image of a flat surface) the binning circuitry may set Pm=mean (P1, P2, P3, P4).

At step 104, the binning circuitry may determine the range (Pd) of the pixel values. The binning circuitry may set Pd=max (P1, P2, P3, P4)−min (P1, P2, P3, P4).

At step 106, the binning circuitry may determine a spatially weighted binning output (Ps) for the group of pixels using the pixel values. If the group of imaging pixels is associated with an upper-left position (e.g., B1-B4 in FIG. 4) then the binning circuitry may set Ps=(9*P1+3*P2+3*P3+1*P4)/16 (such that the heaviest weight is applied to the upper-left pixel value P1 and the lowest weight is applied to the lower-right pixel value P4). If the group of imaging pixels is associated with an upper-right position (e.g., G1-G4 in FIG. 4) then the binning circuitry may set Ps=(3*P1+9*P2+1*P3+3*P4)/16 (such that the heaviest weight is applied to the upper-right pixel value P2 and the lowest weight is applied to the lower-left pixel value P3). If the group of imaging pixels is associated with a lower-left position (e.g., G5-G8 in FIG. 4) then the binning circuitry may set Ps=(3*P1+1*P2+9*P3+3*P4)/16 (such that the heaviest weight is applied to the lower-left pixel value P3 and the lowest weight is applied to the upper-right pixel value P2). If the group of imaging pixels is associated with a lower-right position (e.g., R1-R4 in FIG. 4) then the binning circuitry may set Ps=(1*P1+3*P2+3*P3+9*P4)/16 (such that the heaviest weight is applied to the lower-right pixel value P4 and the lowest weight is applied to the upper-left pixel value P1).

At step 108, the binning circuitry may determine a noise prediction parameter (sigma) using at least the median or mean (Pm) determined at step 102. The noise prediction parameter may be set as sigma=max (noise_floor, noise_coef*sqrt (Pm-offset_value). The noise prediction parameter is, effectively, a prediction of the maximum noise associated with the pixel values.

Finally, at step 110, the binning circuitry may output a binning result (Pout) based on one or more of: one or more tuning thresholds (e.g., k_low and k_high), the median or mean of the pixel values (Pm) determined at step 102, the range of the pixel values (Pd) determined at step 104, the noise prediction parameter (sigma) determined at step 108, and the spatially weighted binning output (Ps) determined at step 106.

Determining the binning result at step 110 may include determining an intermediate value (alpha). The binning circuitry may set alpha=(Pd-sigma*k_low)/(sigma*k_high-sigma*k_low).

k_low may be referred to as a first tuning threshold whereas k_high may be referred to as a second tuning threshold. There may be a maximum possible value max_k_low for k_low. When the first tuning threshold (k_low) is equal to a maximum value for the first tuning threshold or the range is less than or equal to the first tuning threshold multiplied by the noise prediction parameter, the median (or mean) may be used as the binning output. In other words, if k_low=max_k_low or Pd<=k_low*sigma, then the binning circuitry may set Pout=Pm.

When the second tuning threshold is equal to 0 or the range is greater than the second tuning threshold multiplied by the noise prediction parameter, the weighted average may be used as the binning output. In other words, if k_high=0 or Pd>k_high*sigma, then the binning circuitry may set Pout=Ps.

When the first tuning threshold is not equal to the maximum value for the first tuning threshold, the range is not less than or equal to the first tuning threshold multiplied by the noise prediction parameter, the second tuning threshold is not equal to 0, and the range is not greater than the second tuning threshold multiplied by the noise prediction, the sum of the median (or mean) and the intermediate value multiplied by the median subtracted from the weighted average may be used as the binning output. In other words, if k_low≠max_k_low, Pd>k_low*sigma, k_high≠0, and Pd<=k_high*sigma, then the binning circuitry may set Pout=Pm+alpha*(Ps−Pm).

Essentially, the scheme of step 110 causes the median or mean (Pm) to be used as the binning output when the range (Pd) is sufficiently low and causes the spatially weighted output (Ps) to be used as the binning output when the range (Pd) is sufficiently high. For intermediate values of range (Pd), a blend of Pm and Ps is used to avoid undesired blinking between Pm and Ps as the binning output.

In other words, a first group of imaging pixels (e.g., B1-B4) with a first range may have a binning output Pout that is equal to the median or mean (Pm). A second group of imaging pixels in the same image sensor (e.g., G1-G4) with a second range that is greater than the first range may have a binning output Pout that is equal to the spatially weighted output (Ps). A third group of imaging pixels in the same image sensor (e.g., R1-R4) with a third range that is between the first and second ranges may have a binning output Pout that is equal to Pm+alpha*(Ps-Pm).

The tuning threshold k_low may have a magnitude that is greater than or equal to 2, greater than or equal to 3, between (or equal to) 3 and 6, greater than or equal to 6, between (or equal to) 3 and 10, etc.

The tuning threshold k_high may have a magnitude that is greater than or equal to 4, greater than or equal to 6, greater than or equal to 10, etc.

The example herein of applying the hybrid binning scheme to 2×2 groups for imaging pixels is merely illustrative. In general, the hybrid binning scheme may be applied to groups of imaging pixels of any desired size (e.g., 3×3 groups of imaging pixels or groups of any other desired size).

The example of 9:3:3:1 weights for the spatial weighting scheme at step 106 is merely illustrative. In general, any desired weights may be used in the spatial weighting scheme.

Additionally, the example of using median as an alternative to mean in step 102 is merely illustrative. The median of step 102 effectively removes one or more outliers from the pixel values. When four pixel values are being binned (as in the example of a 2×2 group), the median of the pixel values removes the lowest and highest values. In larger groups, the median may be used or an average may be taken after removing one or more outliers. For example, in a 3×3 group of pixels, the two highest and two lowest values may be removed and an average may be taken of the remaining 5 values.

In general, an alternative function to the median may be used at step 102 with any desired number of values (e.g., minimum and maximum values) being removed before averaging the remaining values.

The foregoing is merely illustrative and various modifications can be made to the described embodiments. The foregoing embodiments may be implemented individually or in any combination.

What is claimed is:

1. A method of operating an image sensor comprising a plurality of imaging pixels, wherein the plurality of imaging pixels comprises a plurality of pixel groups, wherein each imaging pixel in the plurality of imaging pixels has a corresponding pixel value, and wherein the method comprises, for each pixel group:
   determining a range of the pixel values of that pixel group; and
   based at least on the determined range, determining a single binning output for that pixel group, wherein determining the single binning output comprises determining the single binning output based at least on a mean of the pixel values of that pixel group, one or more tuning thresholds, a noise type indicator, or one or more noise parameters.

2. The method defined in claim 1, wherein determining the single binning output comprises determining the single binning output based at least on a median of the pixel values of that pixel group.

3. The method defined in claim 1, wherein determining the single binning output comprises determining the single binning output based at least on the mean of the pixel values of that pixel group.

4. The method defined in claim 1, wherein determining the single binning output comprises determining the single binning output based at least on a weighted average of the pixel values of that pixel group.

5. The method defined in claim 1, wherein determining the single binning output comprises determining the single binning output based at least on the one or more tuning thresholds.

6. The method defined in claim 1, wherein determining the single binning output comprises determining the single binning output based at least on the noise type indicator.

7. The method defined in claim 1, wherein determining the single binning output comprises determining the single binning output based at least on the one or more noise parameters.

8. The method defined in claim 1, wherein determining the single binning output comprises determining a noise prediction parameter that is a function of the one or more noise parameters and a median of the pixel values of that pixel group.

9. The method defined in claim 8, wherein determining the single binning output comprises determining an intermediate value that is a function of the range, the noise prediction parameter, a first tuning threshold of the one or more tuning thresholds, and a second tuning threshold of the one or more tuning thresholds.

10. The method defined in claim 9, wherein determining the single binning output comprises using the median as the single binning output when:
the first tuning threshold is equal to a maximum value for the first tuning threshold; or
the range is less than or equal to the first tuning threshold multiplied by the noise prediction parameter.

11. The method defined in claim 10, wherein determining the single binning output comprises using a weighted average of the pixel values of that pixel group as the single binning output when:
the second tuning threshold is equal to 0; or
the range is greater than the second tuning threshold multiplied by the noise prediction parameter.

12. The method defined in claim 11, wherein determining the single binning output comprises using a sum of the median and the intermediate value multiplied by the median subtracted from the weighted average when:
the first tuning threshold is not equal to the maximum value for the first tuning threshold;
the range is not less than or equal to the first tuning threshold multiplied by the noise prediction parameter;
the second tuning threshold is not equal to 0; and
the range is not greater than the second tuning threshold multiplied by the noise prediction parameter.

13. The method defined in claim 1, wherein the imaging pixels in each respective pixel group are a single color.

14. The method defined in claim 1, wherein each pixel group of the plurality of pixel groups comprises four pixels of a single color and wherein the four pixels of the single color are arranged in two rows and two columns.

15. The method defined in claim 1, wherein the plurality of imaging pixels comprises red imaging pixels, green imaging pixels, and blue imaging pixels in a Bayer mosaic pattern.

16. A method of operating an image sensor comprising a plurality of imaging pixels, wherein the plurality of imaging pixels comprises a plurality of pixel groups, wherein each imaging pixel in the plurality of imaging pixels has a corresponding pixel value, and wherein the method comprises:
for a first pixel group of the plurality of pixel groups:
determining a first range of the pixel values of the first pixel group; and
using a median of the pixel values of the first pixel group as a binning output for the first pixel group; and
for a second pixel group of the plurality of pixel groups:
determining a second range of the pixel values of the second pixel group, wherein the second range is greater than the first range; and
using a weighted average of the pixel values of the second pixel group as a binning output for the second pixel group.

17. The method defined in claim 16, further comprising:
for a third pixel group of the plurality of pixel groups:
determining a third range for the pixel values of the third pixel group, wherein the third range is between the first and second ranges;
determining a median of the pixel values of the third pixel group;
determining a weighted average of the pixel values of the third pixel group; and
using a binning output for the third pixel group that is a function of both the median and the weighted average.

18. The method defined in claim 16, wherein the plurality of imaging pixels comprises red imaging pixels, green imaging pixels, and blue imaging pixels in a Bayer mosaic pattern.

19. The method defined in claim 18, wherein each pixel group in the plurality of pixel groups includes imaging pixels of a single color.

20. An image sensor, comprising:
an array of imaging pixels comprising a plurality of pixel groups, wherein the array of imaging pixels comprises red imaging pixels, green imaging pixels, and blue imaging pixels in a Bayer mosaic pattern; and
binning circuitry configured to receive pixel values for each imaging pixel in the array of imaging pixels and, for each pixel group:
determine a range of the pixel values of that pixel group; and
based at least on the determined range, determine a single binning output for that pixel group.

* * * * *